United States Patent [19]
Glasgow

[11] Patent Number: 5,250,891
[45] Date of Patent: Oct. 5, 1993

[54] BATTERY CHARGING METHOD AND APPARATUS

[75] Inventor: Kevin L. Glasgow, North Fond du Lac, Wis.

[73] Assignee: Milwaukee Electric Tool Corporation, Brookfield, Wis.

[21] Appl. No.: 699,489

[22] Filed: May 13, 1991

[51] Int. Cl.⁵ .............................................. H02J 7/00
[52] U.S. Cl. ......................................... 320/31; 320/15
[58] Field of Search .................. 320/20, 21, 31, 2, 15; 363/101

[56] References Cited

U.S. PATENT DOCUMENTS

| | | | |
|---|---|---|---|
| 2,991,410 | 7/1961 | Seike | 323/100 |
| 3,886,427 | 5/1975 | Long | 320/22 |
| 4,355,275 | 10/1982 | Anglin | 320/21 |
| 4,388,582 | 6/1983 | Saar et al. | 320/20 |
| 4,443,752 | 6/1984 | Newman | 320/22 |
| 4,520,929 | 9/1985 | Binkley | 320/2 |
| 4,638,236 | 1/1987 | Carr et al. | 320/21 |
| 4,639,655 | 1/1987 | Westhaver et al. | 320/14 |
| 4,692,680 | 9/1987 | Sherer | 320/2 |
| 4,692,681 | 9/1987 | Nilssen | 320/2 |
| 4,777,424 | 10/1988 | Sakamura et al. | 320/21 |
| 4,847,545 | 7/1989 | Reid | 320/2 |
| 4,849,682 | 7/1989 | Bauer et al. | 320/15 |
| 4,961,043 | 10/1990 | Koenck | 320/21 |
| 5,039,929 | 8/1991 | Veistroffer et al. | 320/2 |

Primary Examiner—Steven L. Stephan
Assistant Examiner—Ben Davidson
Attorney, Agent, or Firm—Michael, Best & Friedrich

[57] ABSTRACT

A battery charger for charging a battery from a DC source includes a step-down convertor coupled to the battery and to a voltage source. When the voltage required to charge the battery is less than that of the DC source, the step-down convertor is connected directly to the source and if the source voltage is less than that required to charge the battery, a step-up convertor is connected between the source and the step-down convertor. Control circuits are provided for sensing the presence of a battery pack, for initiating the flow of charging current, for pulse-width modulating the flow of charging current to the battery and for terminating the flow of charging current when the battery is fully charged as sensed by a predetermined battery temperature or a predetermined drop in battery charging voltage from a peak value. A timer or a latching circuit prevents the resumption of charging current flow until the battery being charged has been removed or replaced.

27 Claims, 5 Drawing Sheets

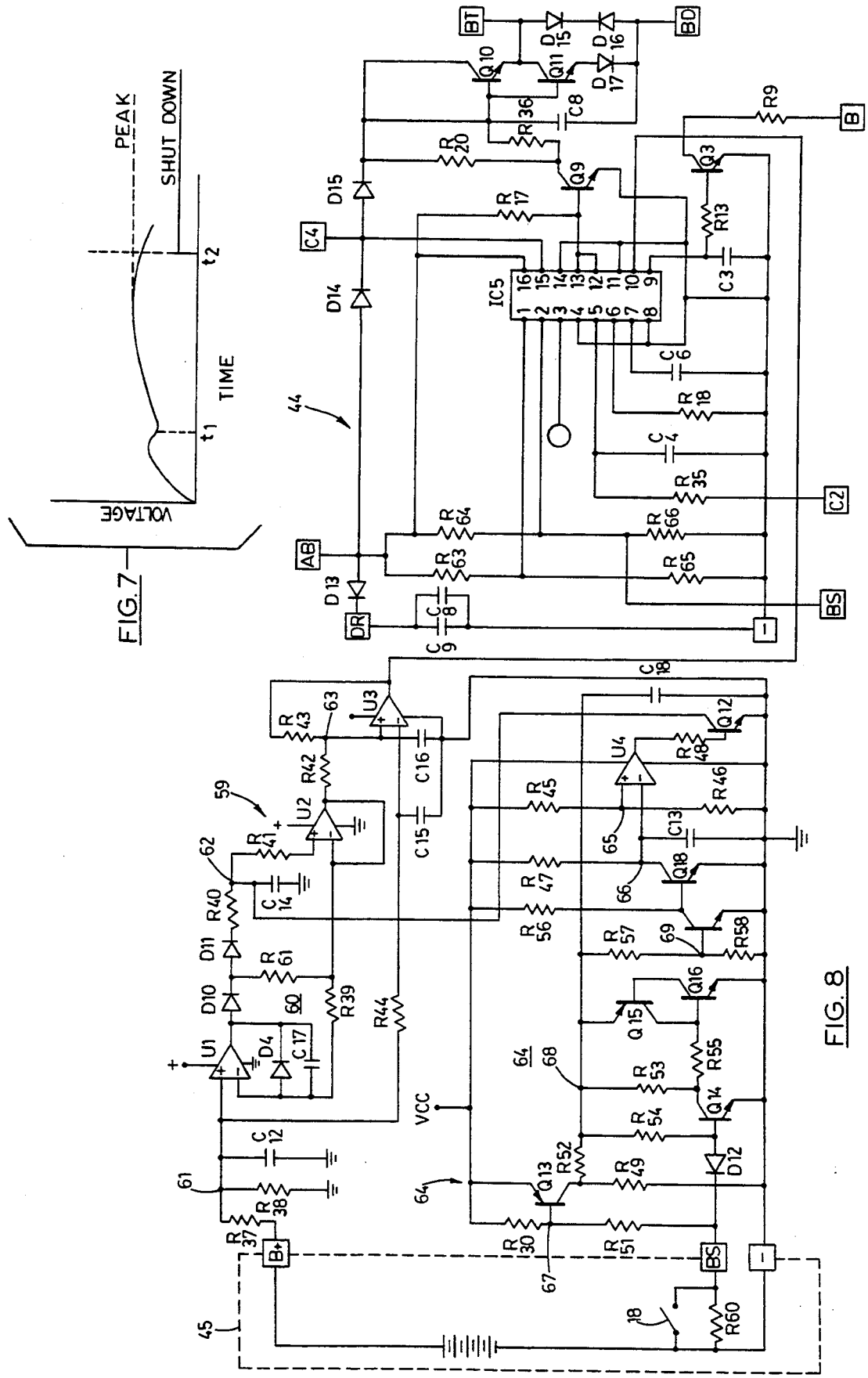

BATTERY CHARGING METHOD AND APPARATUS

BACKGROUND OF THE INVENTION

This invention relates to battery chargers and more particularly to chargers which receive charging current from a storage battery.

One type of battery charger employs a portable DC source, such as a motor vehicle battery, which permits operation in remote locations. An application for such chargers is with portable electric tools which tend to drain the battery pack at a relatively rapid rate when operated on a substantially continuous basis. Therefore, in such applications, it is advantageous to employ removable battery packs which permit the tool to remain in service with an alternate pack while the first pack is being recharged. However, to insure continued tool availability, the battery pack must be charged at a relatively rapid rate. Furthermore, it is desirable that the charger be operable to charge a wide range of nominal battery voltages so that a variety of tools may be serviced.

In order to prevent damage to the battery pack, it is necessary to terminate the flow of charging current when the pack is fully charged. The normal method of providing such protection is to employ a thermoswitch in the battery pack which is operable to disable the charger when the temperature of the battery pack exceeds a predetermined level indicating that the battery is fully charged. Since damage may result if charging current is delivered to a fully charged battery, it is desirable to provide means for preventing the renewal of charging current when the battery pack cools.

SUMMARY OF THE INVENTION

It is an object of the invention to provide a new and improved battery charger.

A further object of the invention is to provide a battery charger which is capable of charging batteries having a wide range of nominal voltages.

Another object of the invention is to provide a battery charger which terminates the flow of charging current when the battery is fully charged and which prevents the resumption of charging current flow after the battery pack being charged has cooled.

Yet another object of the invention is to provide a battery charger which provides a relatively fast charging cycle.

These and other objects and advantages of the present invention will become more apparent from the detailed description thereof taken with the accompanying drawings.

In general terms, one aspect of the invention comprises a battery charger for charging battery means and including first connector means for connecting the charger means to a source of DC voltage, second connector means for connecting the charger means to a battery means, step-down convertor means having an input coupled to the first connector means and an output connected to the second connector means. The step-down convertor means includes means for providing a lower output voltage from a higher input voltage and including current supply means connected between the input and the battery means for providing a charging current to the battery means and having current regulating means for regulating the same. Disabling means is coupled to the output and is responsive to the occurrence of a charge on the battery means in excess of a predetermined level for disabling the current supply means to terminate the flow of charging current to the battery means and for preventing the operation of the current supply means prior to the disconnection of the battery means from the second connector means. According to a specific embodiment of the invention, the disabling means comprises voltage detecting means coupled to the battery means and responsive to a predetermined decrease in battery charging voltage for disabling the current supply means. According to another specific embodiment of the invention, the disabling means comprises timer means operative to disable the current regulating means after a predetermined time delay, circuit means connected to the first connector means and to the timer means and being responsive to the application of a voltage signal at the first connector means and the presence of a battery at the second connector means for actuating the timer means.

According to another of its aspects, the invention comprises a battery charger for charging a battery means and including connector means for connecting the charger means to a source of DC voltage, a step-down convertor means having an input coupled to the connector means and an output adapted to be coupled to the battery means. The step-down convertor means includes means for providing a lower output voltage from a higher input voltage and current supply means connected between the input and the output for supplying charging current to the battery means and regulating means for regulating the charging current independent of the charging voltage, and charge disabling means coupled to the current supply means and to the battery means for preventing the operation of the current regulating means after the battery means has charged to a predetermined charge level.

According to a still further aspect, the invention comprises a method of charging a battery pack means from a DC voltage source and including the steps of coupling a first terminal means to the voltage source for receiving a charging voltage therefrom and coupling a second terminal means to a battery to be charged, reducing the voltage at the first terminal means from the source voltage to a second charging voltage lower than the source voltage, providing a charging current to the battery being charged, regulating said charging current regardless of charging voltage, sensing the occurrence of excess battery charge and terminating the flow of charging current when the battery charge exceeds a predetermined limit and preventing the resumption of charging current until the battery means is uncoupled from said second terminal means and replaced.

According to yet another aspect, the invention comprises a method of charging a battery means form a DC voltage source and including the steps of coupling a first terminal means to the voltage source for receiving a voltage therefrom in excess of the required charging voltage and coupling a second terminal means to a battery means, stepping down the voltage at the first terminal means to provide a lower voltage at the second terminal means, and regulating the current flow to the battery means from the first terminal means regardless of battery voltage.

BRIEF DESCRIPTION OF THE DRAWINGS

FIG. 7 show the relationship of charging voltage plotted against time; and FIG. 8 schematically illustrates a fourth embodiment of the invention.

DETAILED DESCRIPTION OF THE PREFERRED EMBODIMENT

Figure 1:
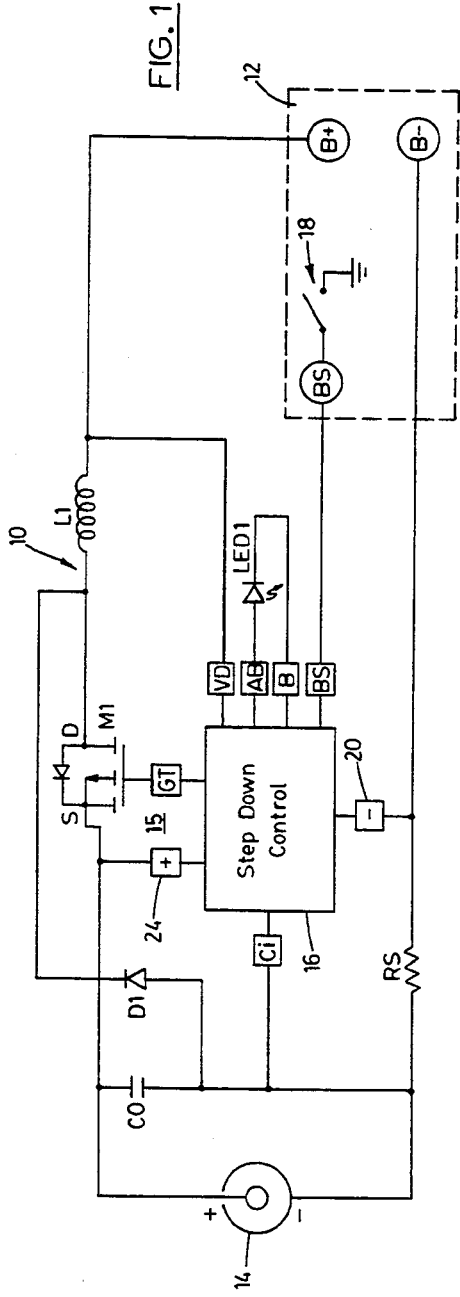
FIG. 1 is a block diagram schematically illustrating a first embodiment of the invention.

FIG. 1 schematically illustrates a first embodiment of the invention to comprise a battery charging circuit 10 for charging a battery pack 12 from a voltage source symbolized by a cigarette lighter connector 14. Those skilled in the art will appreciate that when the connector 14 is inserted into a receptacle in a motor vehicle or the like, it will be connected to the vehicle battery, which is typically twelve volts. In addition, the charger 10 includes a step-down convertor 15 having an input coupled to the connector 14 and an output coupled to terminals B+ and B— which are adapted to be coupled to the battery pack 12. The step-down convertor is operative to provide a lower output voltage from a higher input voltage and includes a control circuit 16 which includes current regulating means for regulating the charging current flowing to the battery pack 12 independent of the output voltage and charge limiting means for preventing the operation of the current regulating means after the battery has charged to a predetermined level. Step-down control circuit 16 provides width regulated pulse gate signals to a power MOSFET M1 which couples the positive terminal of source 14 to the terminal B+ of battery pack 12 through an inductor L1. The charge limiting means includes a thermoswitch 18 in battery pack 12 and which is operable to terminate charging when the temperature of the battery pack 12 exceeds a predetermined value which occurs when the battery pack is fully charged. According to one embodiment of the invention, step-down control circuit 16 also includes a timer means for initiating the pulse gate signals and for preventing the resumption of charging current flow after the battery pack 12 cools. A red light-emitting diode LED1 provides a visible signal when the charger 10 is energized.

Figure 2:
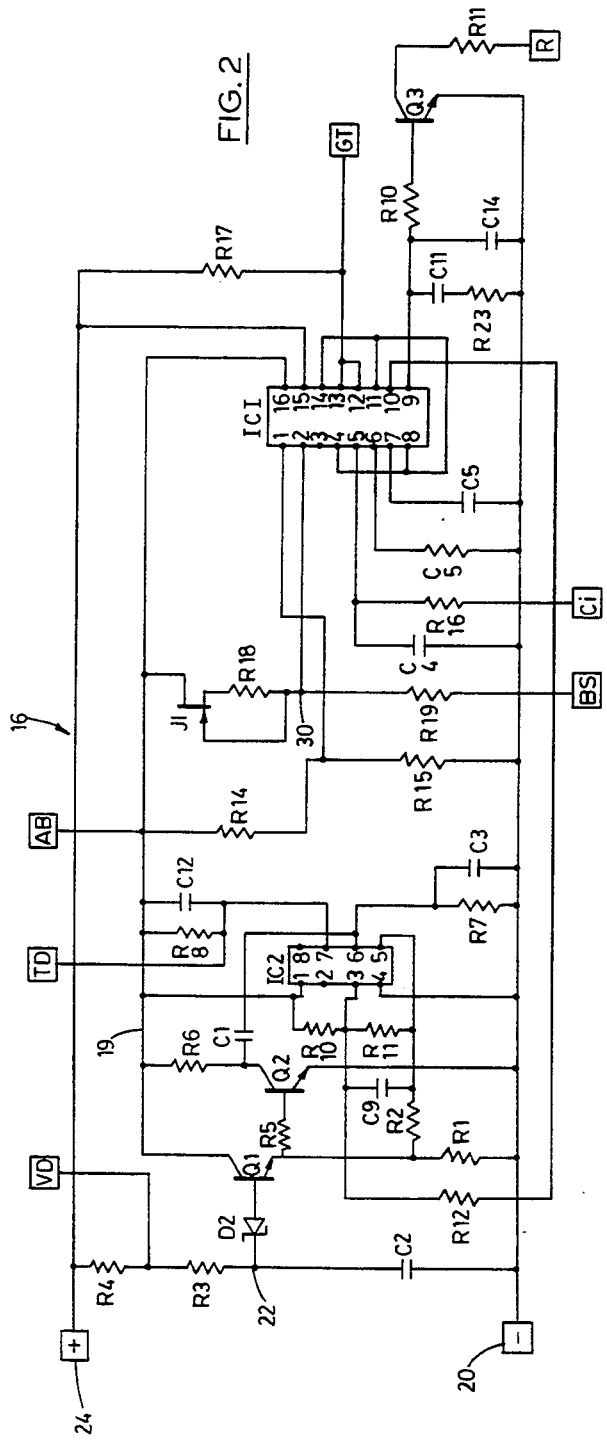
FIG. 2 schematically illustrates a portion of the embodiment of FIG. 1 more specifically.

FIG. 2 shows the step-down control circuit 16 in greater detail to include a regulating pulse-width modulator IC1, which will hereinafter be called a pulse generator, and a long-range fixed timer IC2. As an example, IC1 may be part No. 3524 manufactured by Silicon General Corporation and IC2 may be part No. ICM 7242 manufactured by Harris Semiconductor Company. When the cigarette lighter connector 14 is inserted into a mating socket and a battery pack is coupled to the terminals B+, B— and BS, timer IC2 provides a signal to the pulse generator IC1 which, in turn, provides a square wave signal to terminal GT connected to the gate of MOSFET M1. This turns MOSFET M1 on to provide a charging current to the battery pack through inductor L1. A resistor RS (FIG. 1) consisting of a length of 180 alloy wire is connected between battery B— and the negative terminal of conductor 14 for sensing the battery charging current. This feedback voltage signal is supplied to pulse generator IC1 through terminal Ci for regulating the charging current to battery pack 12. In particular, pulse generator IC1 is operative to control the width of the gate signals to MOSFET M1, and hence the magnitude of the charging current to battery pack 12 in relation to the deviation of the voltage signal at terminal Ci from a reference signal. The pulse generator IC1, the MOSFET M1, the inductor L1, diode D1, and the resistor RS form a current regulator which insures a universal charging current for a range of input and/or nominal battery pack voltages. The resistance of RS can be adjusted or its length selected to provide the desired rate of charge current so that the desired battery charge rate, such as one-half hour, can be achieved.

Operation of the timer IC2 is initiated by a circuit consisting of transistors Q1 and Q2 and capacitor C1. In particular, the collector of transistor Q1 is connected to conductor 19 which in the illustrated embodiment is coupled to pin 16 of IC1 and provides a potential of five volts DC. The emitter of transistor Q1 is connected through resistor R1 to negative input terminal 20 and by resistor R2 to pin 5 of timer IC2. The base of transistor Q1 is connected through zener diode D2 to the junction 22 between a resistor R3 and a capacitor C2. The other terminal of capacitor C2 is connected to negative terminal 20 and the other terminal of resistor R3 is connected through resistor R4 to the positive input terminal 24. The emitter of transistor Q1 is also connected through resistor R5 to the base of transistor Q2. The collector of Q2 is connected through resistor R6 to the conductor 19 and its emitter is connected to the negative terminal 20. One terminal of capacitor C1 is connected to the emitter of transistor Q1 and its other terminal is connected to pin 6 of timer IC2 and to negative terminal 20 through parallel connected resistor R7 and capacitor C3.

When the connector 14 is plugged in to provide a twelve volt DC signal across terminals 20–24, transistor Q1 will receive a positive base signal and become conductive to provide a positive base signal to transistor Q2, thereby connecting capacitor C1 to negative terminal 20. As a result, capacitor C1 is prevented from charging. When a battery pack 12 is connected to terminals B+, B— and BS, the voltage signal at battery terminal B+ will appear at terminal VD. This reduces the voltage signal on the base of transistor Q1 which turns off, thereby reducing the base voltage of Q2 which also becomes non-conductive. As a result, capacitor C1 can begin charging through resistors R6 and R7. This provides a pulse signal to pin 6 of timer IC2, which is thereby actuated.

Upon being actuated, timer IC2 provides an enabling signal to pin 10 of pulse generator IC1 and begins its timing cycle, normally about thirty minutes, which is the normal charging time for the charger. Pulse generator IC1 is actuated by the signal from timer IC2 to provide square wave signals to terminal GT from pin 12. Pulse generating circuit IC1 also provides a positive voltage signal to the base of transistor Q3 through resistor R10. This turns transistor Q3 on to provide a signal to LED1 through resistor R11. The light-emitting diode LED1 transmits a visual signal that the charger is energized.

As shown in FIG. 1, terminal GT is connected to the gate of P-channel MOSFET M1 which receives the square wave signal from IC1. The source and drain of MOSFET M1 are connected between the positive terminal of connector 14 and inductor L1, the other terminal of which is connected to terminal B+ of battery pack 12. Each time the voltage at terminal GT goes low, P-channel MOSFET M1 becomes conductive to pass energizing current to battery pack 12 through inductor L1 and each time terminal GT goes high, P-channel MOSFET turns off to interrupt the flow of charging current. A portion of the energy flow is stored in inductor L1 when P-channel MOSFET M1 is turned on and is discharged to battery pack 12 through diode D1 and inductor L1 when MOSFET M1 turns off so that the charging current has a sawtooth wave form. This minimized the inrush of current to the battery pack when the charger is actuated. The inductance of inductor L1 and the magnitude of the charging current is such that the inductor is not saturated while MOSFET M1 is conductive.

The charging current flowing to battery pack 12 is sensed by the voltage drop across resistor RS, which is coupled to pulse generator IC1 through terminal C1 and resistor R16. The width of the pulses provided to the gate of MOSFET M1 is controlled by comparing the magnitude of the voltage signal at terminal C1 to a reference voltage. Pulse generator IC1 is operable to modulate the width of the pulses delivered to the gate of MOSFET M1 in accordance with the magnitude of the voltage signal at terminal C1 so that the flow of charging current to battery pack terminal B+ is regulated.

The normally open thermoswitch 18 closes when the temperature of the battery pack 12 exceeds a predetermined value, which occurs when the batteries in the pack 12 are fully charged. A unijunction transistor J1 is coupled to the terminal BS and to pin 2 of pulse generator IC1 for providing a signal when the thermoswitch closes to terminate the gate signal to the base of MOSFET M1 through terminal GT. In particular, the drain of unijunction J1 is connected to the 5-volt line 19 and its source is connected to terminal BS through resistors R18 and R19. In addition, the gate of unijunction J1 is connected to the junction 30 between resistors R18 and R20, which terminal is also connected to pin 2 of pulse generator IC1. When the thermoswitch 18 closes, the circuit from the source of unijunction J1 through resistors R18 and R19 is completed whereby unijunction J1 becomes conductive to provide a signal at terminal 30 which terminates the operation of pulse generator IC1.

In order to prevent the resumption of current flow to the battery pack 12 when the battery pack cools and thermoswitch 18 opens, timer IC2 is set such that it will interrupt the enabling signal to pin 10 of pulse generator IC1 prior to the opening of thermoswitch 18. Thus, the thermoswitch 18 and timer IC2 act to prevent the flow of charging current to the battery pack 12 after the battery pack has been charged to a predetermined level.

The battery charger illustrated in FIGS. 1 and 2 provides a uniform charging current for a wide range of battery packs, that is, for example, for one to five 1.2-volt cells. In addition, charging current is provided at a rate which is twice the amp-hour rating of the battery pack. This permits a battery pack to be charged in about one-half hour from a 12-volt source. Also, the charger according to the invention can be used with input voltages ranging from 10 to 15 volts.

Figure 3:
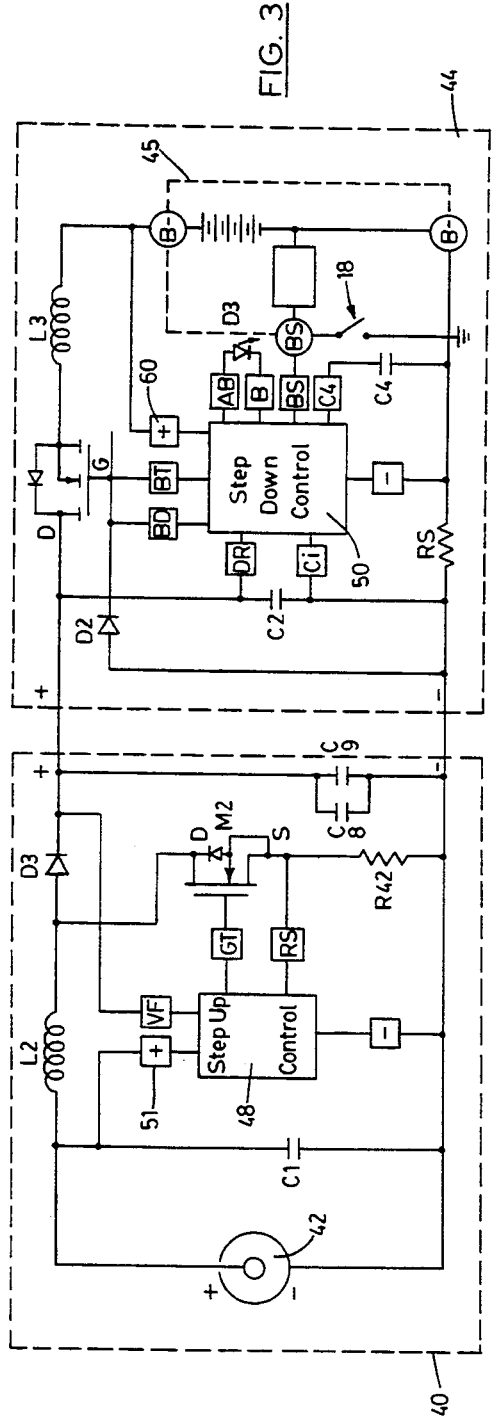
FIG. 3 is a block diagram schematically illustrating a second embodiment of the invention.

FIG. 3 shows an alternate embodiment of the invention for charging battery packs having nominal voltages of up to 12 volts. The charger illustrated in FIG. 3 includes a step-up convertor 40 coupled to the cigarette lighter connector 42 and a step-down convertor 44 coupled between the step-up convertor 40 and the battery pack 45.

The step-up convertor 40 includes a step-up control circuit 48 which is actuated when the cigarette lighter connector 42 is inserted into the lighter socket (not shown). The step-up convertor 40 also includes a MOSFET M2 having its gate connected to terminal GT of control circuit 48, its source connected to the negative terminal of connector 42 through resistor R42 and its drain connected to one terminal of inductor L2, the other terminal of which is connected to the positive terminal of connector 42. Upon being actuated, the step-up control circuit 48 provides a signal through the terminal GT to the gate of MOSFET M2. On the receipt of a gate signal, MOSFET M2 turns on to conduct current through resistor R42 to provide a voltage signal at terminal RS of step-up control 48. This actuates an internal pulse generator which provides pulse signals to the gate of MOSFET M2 through terminal GT. When MOSFET M2 is conductive, energy will be stored in inductor L2 and when MOSFET M2 is not conductive, the energy will be transferred from L2 to capacitor C9 through diode D3. This will continue until the desired increased voltage is achieved, at which point the signal at terminal VF of step-up control 48 will be sufficient to turn off the internal pulse generator.

The step-down convertor 44 includes a second MOSFET M3 having its gate connected to terminal BT of step-down control circuit 50, its source connected to the positive terminal B+ of battery pack 45 through inductor L3 and its drain connected to the positive terminal of connector 42 through inductor L2 and diode D3. The appearance of an enabling signal on terminal DR initiates the operation of the step-down control circuit 50. In particular, a square wave signal is provided to terminal BT which is connected to the gate of MOSFET M3. Upon the receipt of a positive gate signal, MOSFET M3 becomes conductive to pass charging current to battery pack 45 through inductor L3.

Figure 4:
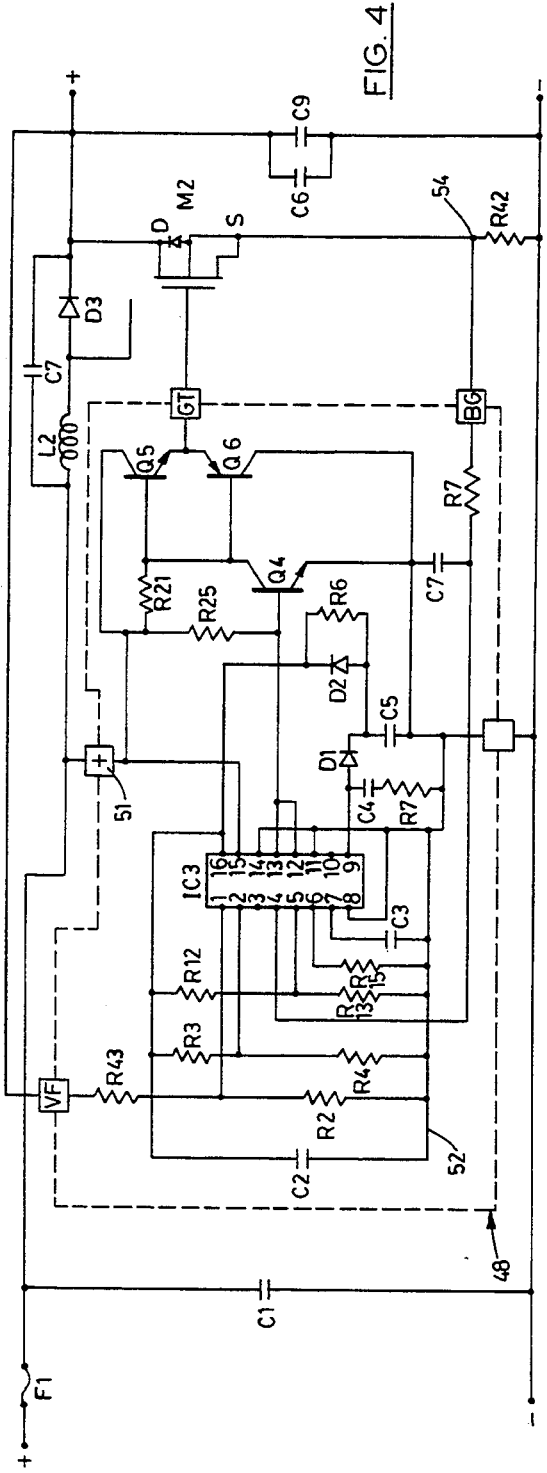
FIG. 4 schematically illustrates a portion of the embodiment of FIG. 3 more specifically.

The step-up control circuit 48 is shown in FIG. 4 to include a first transistor Q4 having its base connected to pins 12 and 13 of a regulating pulse-width modulator IC3 and to the positive terminal 51 through resistor R25, its collector connected to the positive terminal 51 through resistor R21 and its emitter connected to the common 52. The collector of transistor Q4 is also connected to the bases of a pair of transistors Q5 and Q6 whose emitters are both connected to terminal GT and whose collectors are respectively connected to the positive terminal 51 and common 52. Regulating pulse-width modulator or pulse generator IC3 may be identical to IC1 shown in FIG. 2. Pins 12 and 13 of pulse-width modulator IC3 provide square wave pulses to the base of transistor Q4.

When the connector 42 is plugged in, the base of transistor Q4 is grounded so that Q4 is non-conductive. This places a positive potential on the bases of transistors Q5 and Q6, which turn on to provide a gate signal to MOSFET M2. This turns on MOSFET M2 to conduct current through resistor R42. When the potential across resistor R42 reaches a predetermined value, which in the illustrated embodiment is 0.18 volts, the signal provided to pin 4 through terminal BG will actuate pulse generator IC3 which provides a square wave signal from pins 12 and 13 to the base of transistor Q4. This causes transistor Q4 to turn on and off, thereby turning transistors Q5 and Q6 on and off to provide an intermittent gate signal to MOSFET M2. Each time MOSFET M2 turns on, energy will be stored in inductor L2 and each time MOSFET M2 turns off, this energy will be transferred to capacitor C9 through diode D3. When the charge on capacitor C9 reaches a predetermined value, a feedback signal through terminal VF and resistor R43 is provided to pin 1 of pulse generator IC3, thereby turning IC3 off.

Figure 5:
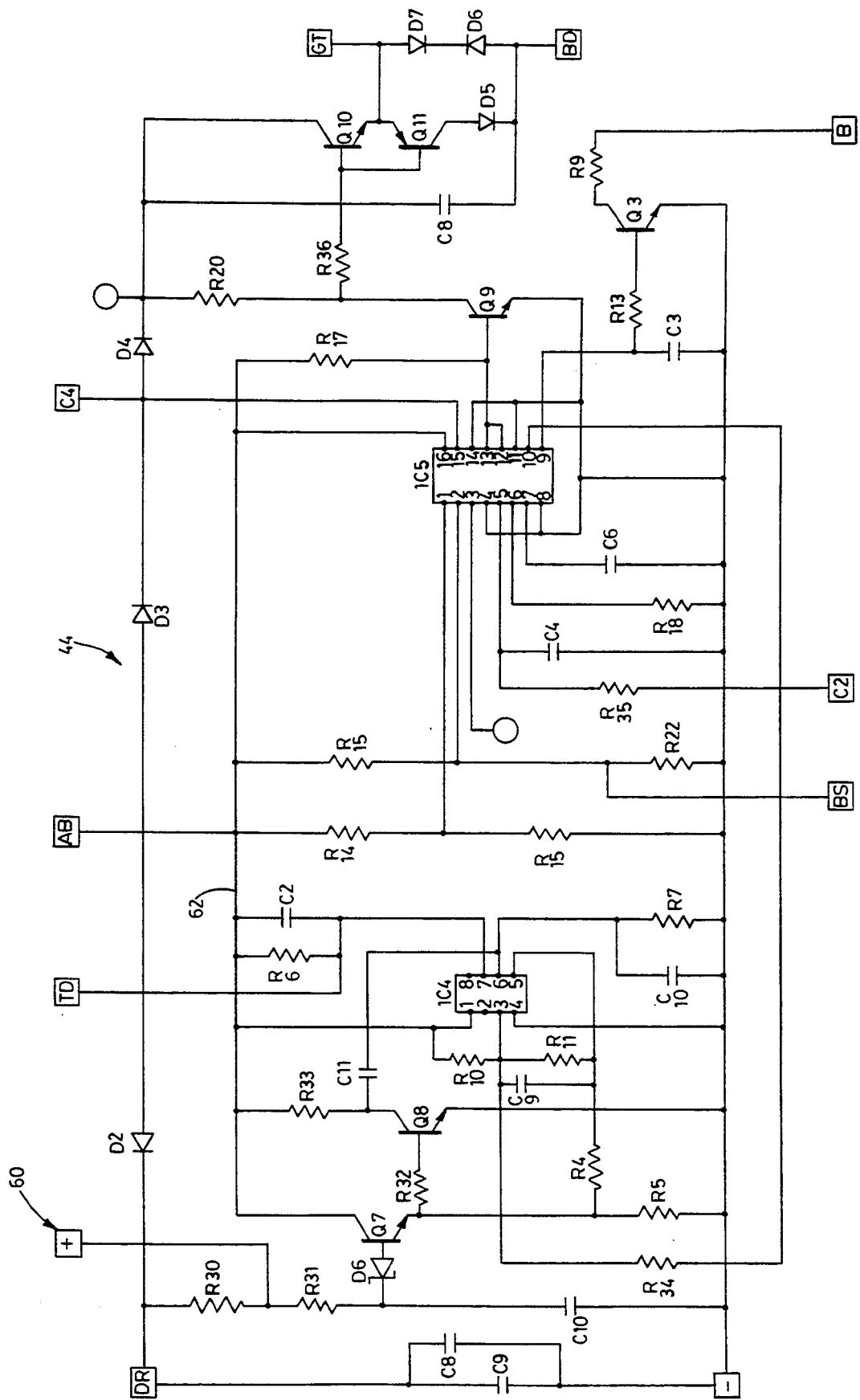
FIG. 5 schematically illustrates another portion of the embodiment of FIG. 3 more specifically.

Reference is now made to the step-down convertor 44 shown in FIG. 5. This circuitry and its various components are substantially the same as that described with reference to FIG. 2. For example, timer IC4 and pulse generator IC5 are the same as components IC1 and IC2, respectively, of FIG. 2.

Terminal DR of control circuit 44 is shown in FIG. 5 to be connected to capacitor C9 for receiving the voltage signal thereacross. When capacitor C9 is fully charged, a positive base signal of sufficient magnitude it provided to the base of transistor Q7 through resistors R30 and R31 and zener diode D6 so that transistor Q7 is turned on. This in turn provides a positive base signal to transistor Q8 through resistor R32 so that transistor Q8 is turned on to prevent capacitor C11 from charging.

When a battery pack 42 is coupled to contacts B+, B− and BS as seen in FIG. 3, the positive terminal 60 of control circuit 44 goes to the battery B+ voltage. This reduces the potential on the base of transistor Q7, which turns off, thereby turning off transistor Q8. As a result, capacitor C11 begins charging to the potential of conductor 62 through resistor R33, thereby providing a trigger pulse to pin 6 of timer IC4, which is actuated. When timer IC4 begins its timing cycle, an enabling signal is provided from pin 3 through resistor R34 to pin 10 of pulse generator IC5. Upon being actuated, pulse generator IC5 provides a square wave signal to the base of transistor Q9, the collector of which is connected to the bases of transistors Q10 and Q11 through resistors R20 and R36. Each time the base pulse signal is provided, transistor Q9 turns on and off, causing transistors Q10 and Q11 to turn one and off, thereby providing an intermittent gate signal to MOSFET M3 through terminal GT. As seen in FIG. 3, the source and drain of MOSFET M3 are connected between the positive terminal of capacitor C9 and conductor L3. The other terminal of inductor L3 is connected to terminal B+ of battery pack 45. Energy is stored in inductor L3 and each time MOSFET M3 is turned on and the stored energy is transferred to the battery pack 45 each time MOSFET M3 turns off.

The charging current flowing to battery pack 45 results in a drop across resistor R5 (FIG. 3) and this signal is provided to terminal Ci, which is connected through resistor R35 to pin 5 of IC5. This controls the width of the base signal pulses from pins 12 and 13, thereby pulse-width modulating the current flowing to battery pack 45. The thermoswitch 18 shown in FIG. 4 operates in the same manner as the correspondingly numbered thermoswitch in the embodiment of FIG. 2.

Figure 6:
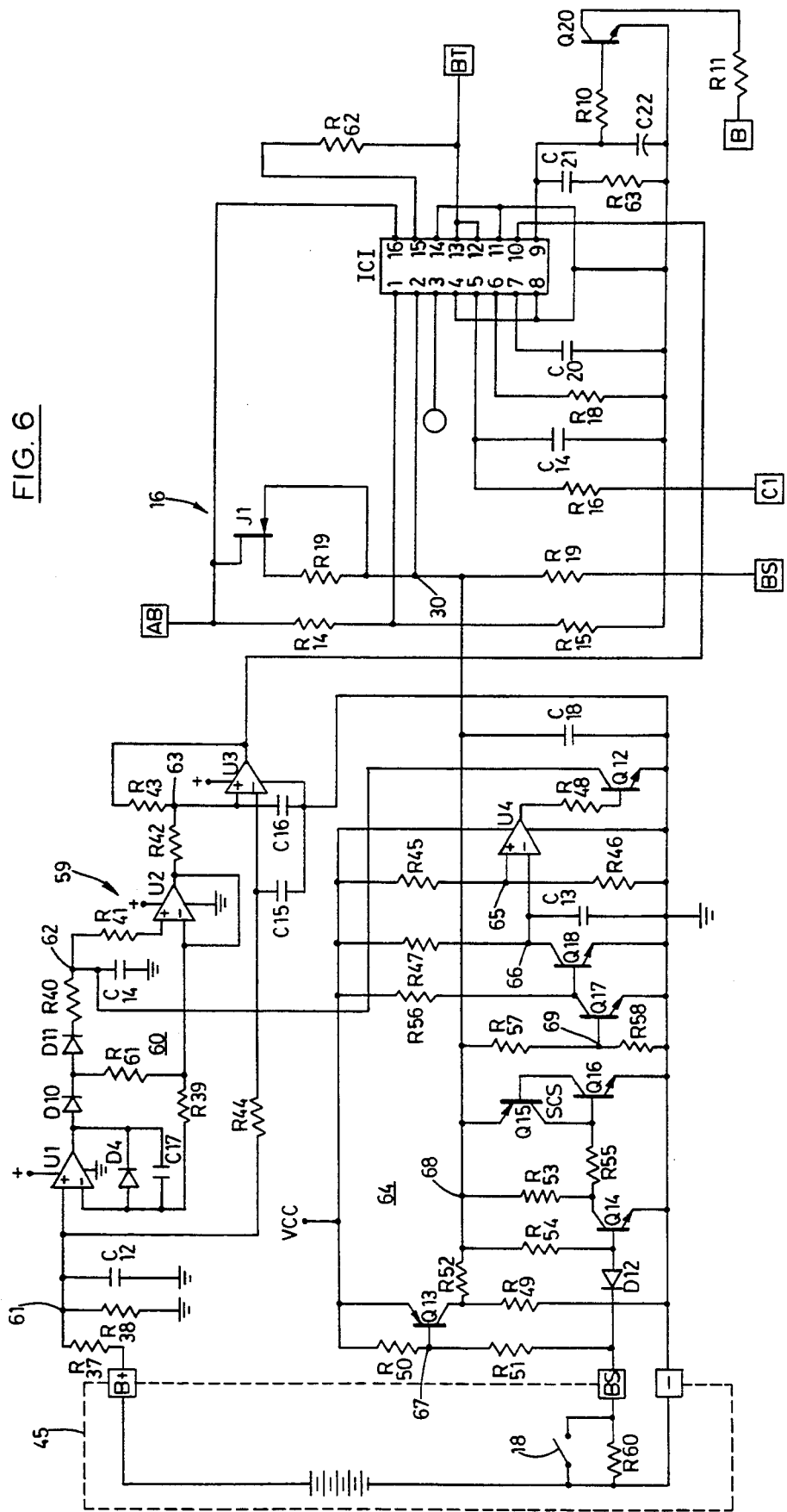
FIG. 6 schematically illustrates a third embodiment of the invention.

FIG. 6 shows an alternate embodiment of the invention wherein the timer IC2 and its associated circuitry as illustrated in FIG. 2 is replaced by a voltage slope detection circuit 59, which takes advantage of the fact that as a battery pack begins to go into an overcharge condition, the charge voltage across the battery will decrease or "droop". The voltage slope detection circuit 59 is operative to trip the pulse generator IC1 and latch the same in a tripped condition upon the occurrence of a predetermined drop in battery charging voltage. It will be appreciated that pulse generator IC1 is the same component as IC1 discussed with respect to FIG. 2.

The voltage slope detection circuit 59 includes first and second operational amplifiers U1 and U2 connected as a voltage peak detector 60. In particular, the positive terminal of operational amplifier U1 is connected to the junction 61 between resistors 37 and 38, which form a voltage divider between the battery terminal B+ and ground. The positive terminal of U1 thus receives a voltage proportional to the potential at the positive battery terminal. The negative terminal of U1 is connected to the negative terminal of operational amplifier U2 through resistor R39 and the output of U1 is connected to the positive terminal of U2 through diodes D10 and D11 and a voltage divider consisting of resistors R40 and R41. A holding capacitor C14 is connected at one end to the junction 62 between resistors R40 and R41 and at its other end to ground.

A third operational amplifier U3 is connected as a comparator and latch whose output is connected to pin 10 of pulse generator IC1 and is operative to trigger the pulse generator IC1 off and latch it in that state when there is a predetermined dropoff of battery charging voltage. In particular, the positive terminal of U3 is connected to the junctions 63 between resistors 42 and 43 forming a voltage divider for receiving a voltage proportional to the output of the peak voltage detector 60 and its negative terminal is connected through resistor R44 to junction 61 between resistors R37 and R38 for receiving a voltage proportional to the battery charging voltage.

The voltage slope detection circuit 59 monitors the battery voltage profile and detects and holds the peak voltage values on capacitor C14 during a given charge cycle. When the battery pack approaches and goes into an overcharge state, the charging voltage across the battery begins to decrease. At a predetermined point controlled by operational amplifier U3, a shutdown signal is provided to the pulse generating circuit IC1 so that the flow of charging current to the battery is terminated.

The junction 63 between resistors R42 and R43 provides a positive input to operational amplifier U3 proportional to the peak charging voltage. The voltage at the junction 61 between resistors R37 and R38 provides the negative input to operational amplifier U2 and also the positive input to the peak detector circuit. During normal charging conditions, the peak detector 60 provides a voltage signal to the positive input of U3 that is lower than the negative input, thus causing U3 output to be low. As the battery begins to overcharge, the battery charging voltage will begin to decrease, thereby decreasing the voltage at junction 61. The voltage at junction 63, which is the positive input of operational amplifier U3, is held at the peak voltage by the capacitor C14. When the negative input voltage at operational amplifier U3 falls to a value which is equal to or below the positive input voltage as a result of the droop in charging voltage, the output of comparator U3 goes high, providing a signal to pin 10 of the pulse generating circuit IC1. This terminates the flow of battery charging current.

The output signal at U3 also pulls up the voltage at terminal 63, causing the threshold level of the operational amplifier U3 to increase. Thus, the appearance of an output signal on operational amplifier U3 not only terminates the flow of charging current to the battery pack, but also raises the switching level so that operational amplifier U3 remains on. Termination of the flow of charging current to the battery causes the battery voltage to droop further to its open circuit voltage. As a result of the raising of the threshold level of operational amplifier U3 and the drop in battery voltage, the slope detection circuit 59 is prevented from resetting, or, in other words, the pulse generator IC1 is latched in an "off" condition.

A reset circuit 64 is coupled to the peak detector circuit and includes an operational amplifier U4 whose positive terminal is connected to the junction 65 of a first voltage divider consisting of resistors R45 and R46 connected between a DC source Vcc and ground. The negative terminal of U4 is connected to the junction 66 between a resistor R47 and a capacitor C13 which form an RC time delay circuit connected in parallel with resistors R45 and R46. The output of U4 is connected through resistor R48 to the base of a transistor Q12 whose emitter is connected to ground and whose collector is connected to junction 62 between resistors R40 and R41 of slope detection circuit 59.

Reset circuit 64 also includes a second transistor Q13 whose emitter is connected to the positive voltage source Vcc and its collector is connected to ground through resistor R49. The base of transistor Q13 is connected to junction 67 between resistors R50 and R51, which form a voltage divider connected between Vcc and the BS terminal of battery pack 45. The collector of Q13 is also connected to a junction 68 through resistor R52. The emitter of a third transistor Q14 is connected to ground and its collector is connected through resistor R53 to junction 68 and its base is connected to junction 68 through resistor R54 and to the battery pack terminal BS through diode D12. In addition, a pair of transistors Q15 and Q16 are connected as a silicon controlled switch SCS having an anode connected to junction 68, a cathode connected to ground and a gate connected through resistor R55 to the collector of transistor Q14. The reset circuit 64 also includes a fourth transistor Q17 whose emitter is connected to ground and its collector is connected to Vcc through resistor R56 and its base it connected to the junction 69 between resistors R57 and R58 in series between junction 68 and ground. Finally, a fifth transistor Q18 has an emitter connected to ground, a collector connected to Vcc through resistor R47 and a base connected to the collector of transistor Q17.

Resistor R60, which is part of the battery pack 45, is placed in series with resistors R50 and R51 when the battery pack is initially coupled to terminals B+, B- and BS. This provides a base signal on transistor Q13, which becomes conductive. The conduction of transistor Q13 provides a positive potential at junction 68 so that transistor Q17 is conductive, thereby connecting the base of transistor Q18 to ground so that Q18 is non-conductive. This will cause the output of operational amplifier U4 to be low so that transistor Q12 is non-conductive and the capacitor C14 of slope detection circuit 59 can charge and hold the peak charging voltage. Also, diode D12 is reverse biased so that transistor Q14 is conductive and there is no gate signal to the silicon-controlled switch SCS. After the charging cycle is completed and the battery pack is removed, the circuit path through terminal BS is removed so that transistor Q13 turns off to remove the base signal from transistor Q17 which becomes non-conductive. This turns transistor Q18 on whereby the output of operational amplifier U4 goes high to provide a base signal to transistor Q12 which becomes conductive to discharge capacitor C14. The slope detection circuit 59 is thus reset for a subsequent charging operation.

The thermal sensor 18 provides a normally open switch function when the battery temperature is below a predetermined level. If the thermal sensor 18 closes during a charging cycle as a result of a rise in battery temperature above a predetermined level, transistor Q14 will be turned off. As a result, a gate signal is provided to the silicon-controlled switch SCS, which becomes conductive to latch junction 68 to a low voltage of less than one volt. This reduced potential is applied to pin 2 of the pulse-width modulating circuit IC1, which is disabled so that the flow of charging current ceases. The charger will remain off even when the battery pack has cooled and the thermal sensor 18 opens because silicon-controlled switch SCS remains conductive until the battery pack is removed.

It has been found that the battery charging characteristic has a predetermined peak amplitude during an initial portion of the charging cycle as shown in FIG. 7. In order to prevent the voltage slope detection circuit 59 from providing a premature disabling signal to the pulse generator IC1, the operation of the reset circuit 64 is delayed upon the insertion of a new battery pack 45. In particular, when a new battery pack 45 is inserted, a base signal is provided to transistor Q13 which becomes conductive. This turns transistor Q17 on, which turns transistor Q18 off so that the voltage at terminal 66 begins rising along a time delay curve determined by the resistance of resistor R47 and the capacitance of capacitor C13. When the voltage at terminal 66 reaches a predetermined value, the output of U4 goes low so that transistor Q12 becomes non-conductive and capacitor C14 can begin charging. As shown in FIG. 7, the time delay provided by the RC circuit R47 and C13 will be such that capacitor C14 will not begin charging until time t1, which is after the premature charging peak has passed. At time t2, the shutdown signal is provided from the slope detection circuit 59 t pin 10 of pulse generator IC1.

FIG. 8 illustrates how the voltage slope detection circuit 59 can be incorporated into the step-down convertor 44 shown in FIG. 5 in place of the timer IC2 and its associated components. The voltage slope detection circuit is operative in the same manner as discussed with respect to FIG. 7 to provide a trip signal to the pulse generating circuit IC5. Accordingly, this circuit will not be discussed in detail for the sake of brevity.

It will be appreciated that in all the embodiments of the invention, the battery pack to be charged is connected to the voltage source through a step-down convertor which reduces a higher voltage to a lower voltage required to charge the battery. In the case of the embodiments of FIGS. 3, 4, 5 and 8, where the voltage source is lower than that required to charge the battery pack, a step-up convertor is employed between the voltage source and the step-down convertor. In all embodiments, a regulated charging current is provided for a range of battery pack voltages and batteries are charged at twice their amp hour ratings so that rapid recharging is achieved. In addition, timers or a reset circuit prevent the resumption of charging current flow to the batteries after the fully charged batteries have cooled, thereby preventing battery damage through overcharging.

While only a few embodiments of the invention have been illustrated and described, the invention is not limited thereby but only by the scope of the appended claims.

I claim:

1. The combination of a relatively fixed source of DC voltage and a battery charger from said DC source for charging any one of a plurality of battery means having different nominal voltage ratings, said DC voltage source having a voltage level which is higher than the nominal voltage levels of the battery means to be charged, said charger including first connector means for connecting said battery charger to said DC voltage source and second connector means constructed and arranged to be connected to and disconnected from a battery means for connecting said battery charger to a battery means to be charged, step down converter means having an input coupled to said first connector means and an output connected to said second connector means, said step down convertor means comprising means for providing a lower output voltage from the relatively higher input voltage of the DC voltage source, said step down converter means including current supply means connected to said second terminal means and operative when activated for providing a relatively constant charging current to the battery means to be charged and having current regulating means for regulating charging current, battery presence responsive means coupled to said second connector means and to said current supply means for sensing the connection and disconnection of a battery means to the second connector means and operative upon sensing the connection of a battery means to said second connector means for initiating the operation of said current supply means, disabling means responsive to the occurrence of a charge in the battery means being charged in excess of a predetermined level for disabling the current supply means to terminate the flow of charging current to the battery means being charged, said battery presence responsive means also being operable to prevent the operation of the current supply means after the battery means is charged to a predetermined level and until the battery presence responsive means senses both the disconnection of the charged battery means from the second connector means and the connection of another battery means to said second connector means.

2. The combination set forth in claim 1 wherein said disabling means comprises voltage detecting means coupled to the battery means being charged and responsive to a predetermined decrease in battery charging voltage for disabling said current supply means.

3. The combination set forth in claim 1 and including timer means, circuit means connected to said first connector means and to said timer means and being responsive to the application of a voltage signal at the first connector means and the presence of a battery at said second connector means for actuating said timer means, said timer means being operative to prevent the current regulating means from being enabled after a predetermined time delay to prevent the charger from restarting until the first battery means is removed and replaced.

4. The combination set forth in claim 2 wherein said voltage detecting means includes first means for detecting the peak charging voltage, second means for sensing battery charging voltage and for disabling said current supply means upon a predetermined decrease in battery charging voltage from the peak voltage, said second means also being operative to latch said current supply means in its disabled state, and third means responsive to the removal of the battery means from the battery charger for providing an unlatching signal to the second means whereby said current regulating means may be enabled.

5. The combination set forth in claim 4 and including time delay means for delaying the operation of said second means for a predetermined period after the initiation of a battery charging operation.

6. The combination set forth in claim 1, and including step-up convertor means having an output coupled to the input of the step-down convertor means and an input coupled to the source of DC voltage, said step-up convertor means being operative to produce an output voltage higher than its input voltage.

7. The combination set forth in claim 1 wherein said current regulating means includes pulse generating means for producing intermittent voltage signals, switching means having control means coupled to receive said voltage signals, inductor means, said switching means and said inductor means being connected in a series circuit relation and connected in circuit between said input and the battery means, said switching circuit being operative in response to said intermittent voltage signal for coupling and uncoupling said inductor means to said input.

8. The combination set forth in claim 7 and including circuit means coupled between said input and said output for measuring the flow of charging current to the battery means and for producing a feedback signal functionally related thereto, said current regulating means being coupled to receive said feedback signal and for controlling the duration of the voltage pulses in response thereto.

9. The combination set forth in claim 3 wherein said disabling means comprises thermoresponsive means in thermal association with the battery means, said thermoresponsive means being operative to disable the current supply means to terminate the flow of charging current when the temperature of the battery pack reaches a predetermined level.

10. The combination set forth in claim 2 wherein said current regulating means includes pulse generating means for producing intermittent voltage signals, switching means having control means coupled to receive said voltage signals, inductor means, said switching means and said inductor means being connected in a series circuit relation and connected in a circuit between said first connector means and the battery means, said switching circuit being operative in response to said intermittent voltage signals for coupling and uncoupling said inductor to said first connector means.

11. The combination set forth in claim 10 and including second circuit means coupled between said first and second connector means for measuring the flow of charging current to the battery means and for producing a feedback signal functionally related thereto, said current regulating means being coupled to receive said feedback signal and for controlling the duration of the voltage pulses in response thereto.

12. The combination set forth in claim 6 and including energy storage means connected across the output of the step-up convertor means and charging circuit means for coupling said energy storage means to said first connector means.

13. The combination set forth in claim 12 wherein said charging circuit means includes second switching means connected in a parallel circuit relation with said energy storage means, inductor means in circuit with said second switching means and the input terminals of the step-up convertor means, second pulse generating means, second circuit means coupled to said first connector means and to the pulse generating means and operative when the first connector means is coupled to a voltage source for actuating said second switching means, said switching means being operative to provide an actuating signal to said pulse generating means, said pulse generating means being operative to active and deactivate said switching means so that said switching circuit means will cycle between on and off conditions so that the energy stored in said inductor means will be transferred to said energy storage means each time said switching means opens and energy will be stored in said inductive means when said switch means is closed.

14. The combination set forth in claim 12 wherein said disabling means includes thermoresponsive means in thermal association with the battery means, said thermoresponsive means being operative to disable the current regulating means to terminate the flow of charging current when the temperature of the battery means reaches a predetermined level.

15. The combination set forth in claim 1 wherein said current regulating means includes pulse generating means for producing intermittent voltage signals, switching means having control means coupled to receive said voltage signals, inductor means, said switching means and said inductor means being connected in a series circuit relation and connected in circuit between said first connector means and the battery means, said switching means being operative in response to said intermittent voltage signals for coupling and uncoupling said inductor means to said input.

16. The combination set forth in claim 15 and including second circuit means coupled to between said input and said output for measuring the flow of charging current to the battery means and for producing a feedback signal functionally related thereto, said current regulating means being coupled to receive said feedback signal and for controlling the duration of the voltage pulses in response thereto.

17. The combination set forth in claim 16 and including energy storage means connected across the output terminals of the step-up convertor means and charging circuit means for coupling said energy storage means to said connector means.

18. The battery charger set forth in claim 16 wherein said charging circuit means includes second switching means connected in a parallel circuit relation with said energy storage means, inductor means in circuit with said second switching means and the input terminals of the step-up convertor, second pulse generating means, second circuit means coupled to said input and to the pulse generating means and operative when the connector is coupled to a voltage source for actuating said second switching means, said second switching means being operative to provide an actuating signal to said pulse generating means, said pulse generating means being operative to activate and deactivate said second switching means so that said second switching circuit means will cycle between on and off conditions so that the energy stored in said inductor means will be transferred to said energy storage mean each time said second switching means opens and energy will be stored in said inductive means when said second switching means is closed.

19. A method of charging any one of a plurality of battery pack means each having a different nominal voltage rating from a DC voltage source having a substantially fixed voltage with a battery charger having first and second terminals means, and including the steps of coupling a first terminal means to said voltage source for receiving a relatively fixed voltage therefrom and coupling a second terminal means to a first battery pack means to be charged, sensing the coupling of the first battery pack means to the second terminal means, initiating a timing cycle and initiating the flow of charging current to the first battery pack means when the coupling of the first battery pack means to the second terminal is sensed, reducing the substantially fixed voltage at the first terminal means to a lower voltage at said second terminal means while regulating the flow of current to the first battery pack regardless of battery voltage, terminating the flow of charging current when the charge on said first battery pack means exceeds a predetermined value, and thereafter preventing the resumption of charging current flow the first battery pack means, sensing the disconnection of the first battery pack means from the second terminal means and the reconnection of another battery pack means thereto, and preventing the flow of charging current to the second terminal means until after the disconnection of the first battery pack means and the connection of another is sensed.

20. The method set forth in claim 19 and including the steps of sensing the battery charging voltage, holding the peak charging voltage, terminating the flow of charging current to the battery when there is a predetermined decrease in battery charging voltage from the peak charging voltage.

21. The method set forth in claim 20 and including the step of stepping up the voltage at the first terminal to a higher voltage prior to stepping down said higher voltage to a lower voltage at the second terminal means.

22. The method as set forth in claim 19 and including the steps of initiating a timing cycle upon the commencement of charging current flow to the first battery pack means, and measuring the temperature of the battery means and terminating the flow of charging current thereto when the temperature exceeds a predetermined value.

23. The method set forth in clam 19 and including the step of stepping up to voltage at the first terminal means to a higher voltage prior to stepping down said higher voltage to a lower voltage at the second terminal means.

24. The method set forth in claim 19 and including the step of stepping up the voltage at the first terminal means to a higher voltage prior to stepping down said higher voltage to a lower voltage at the second terminal means.

25. The method set forth in claim 19 including the step of measuring the rate of charging current flow to the battery means, generating a series of pulse-width modulating signals for regulating the flow of charging current to the battery means.

26. The method set forth in claim 24 and including the step of storing energy in an inductor during each occurrence of the pulses an discharging the energy into the first battery pack means being charged when said pulse signals terminate.

27. The method set forth in claim 26 including the step of measuring the rate of charging current flow to the battery means, generating a series of pulse-width modulating signals for regulating the flow of charging current to the battery means.

* * * * *